United States Patent [19]

Metzmaker

[11] Patent Number: 5,260,684
[45] Date of Patent: Nov. 9, 1993

[54] WARNING SYSTEM FOR A CHILD'S RESTRAINING SEAT FOR USE IN A PASSENGER VEHICLE

[75] Inventor: David Metzmaker, Beaverton, Mich.

[73] Assignee: Northpoint Manufacturing & Marketing, Inc., Mt. Pleasant, Mich.

[21] Appl. No.: 699,931

[22] Filed: May 14, 1991

[51] Int. Cl.⁵ ............................................. B60Q 9/00
[52] U.S. Cl. .................. 340/457.1; 340/425.5; 340/438; 340/440; 340/667
[58] Field of Search .............. 340/425.5, 666, 667, 340/665, 429, 438, 440, 457.1

[56] References Cited

U.S. PATENT DOCUMENTS

| | | | |
|---|---|---|---|
| 2,584,481 | 2/1952 | Mast et al. | 155/45 |
| 3,263,211 | 7/1966 | Heidman, Jr. | 340/81 |
| 3,436,758 | 4/1969 | Kluth | 340/376 |
| 3,883,751 | 5/1975 | Salway | 340/667 |
| 3,906,441 | 9/1975 | Andersen et al. | 340/667 |
| 3,944,972 | 3/1976 | Chandler | 340/74 |
| 4,072,850 | 2/1978 | McGlynn | 364/424 |
| 4,096,474 | 6/1978 | Greer et al. | 340/261 |
| 4,336,522 | 6/1982 | Graham | 340/667 |
| 4,402,548 | 9/1983 | Mason | 297/464 |
| 4,533,176 | 8/1985 | Wyttenbach | 297/238 |
| 4,538,142 | 8/1985 | Hamilton et al. | 340/667 |
| 4,555,135 | 11/1985 | Freeland | 297/105 |
| 4,595,618 | 6/1986 | Caringer | 428/100 |
| 4,598,945 | 7/1986 | Hopkins | 280/261 |
| 4,664,443 | 5/1987 | Casale | 297/238 |
| 4,681,367 | 7/1987 | Timmers | 297/232 |
| 4,690,455 | 9/1987 | Bailey et al. | 297/238 |
| 4,756,573 | 7/1988 | Simin et al. | 297/250 |
| 4,768,827 | 9/1988 | Musgrove | 297/236 |
| 4,834,404 | 5/1989 | Wood | 280/33.993 |
| 4,861,105 | 8/1989 | Merten et al. | 297/250 |
| 4,873,452 | 10/1989 | Morota et al. | 340/438 |
| 4,900,086 | 2/1990 | Steward | 297/238 |
| 4,900,087 | 2/1990 | Crisp | 297/238 |
| 4,913,498 | 4/1990 | Forlivio | 297/488 |
| 4,936,627 | 6/1990 | Guim | 297/238 |
| 4,958,887 | 9/1990 | Meeker | 297/250 |
| 4,975,850 | 12/1990 | Diller | 340/438 |
| 5,007,661 | 4/1991 | Lenzen | 340/438 |
| 5,055,824 | 10/1991 | Hanaue | 340/438 |

FOREIGN PATENT DOCUMENTS 3236737  5/1984  Fed. Rep. of Germany ...... 340/440

OTHER PUBLICATIONS

2 Brochures for "Instructions for Installation and Usage Century 1000 STE Car Seat" and Instructions and Usage Century 2000 STE Convertible Car Seat for Infants and Toddlers.
1 Leaflet for Century Convertible Car Seats.

Primary Examiner—John K. Peng
Assistant Examiner—Edward Lefkowitz
Attorney, Agent, or Firm—Krass & Young

[57] ABSTRACT

A child warning system for use in an integrated or portable child restraining seat that includes an occupancy indicator, an emergency signal and warning indicators. An electrical circuit provides a warning indication until deactuation switches are actuated to deactuate the warning indicators. A vibration sensor switch actuates an emergency signal that remains actuated until the electrical circuit is reset.

21 Claims, 4 Drawing Sheets

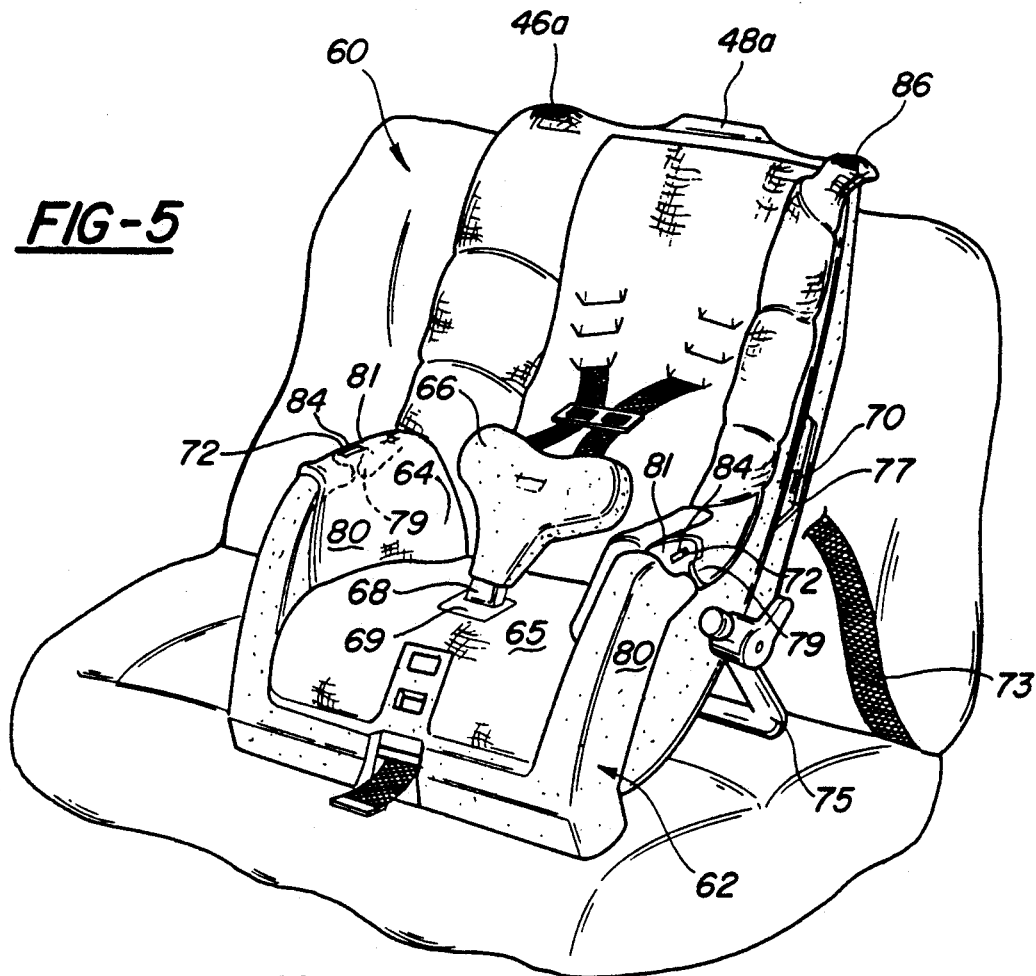
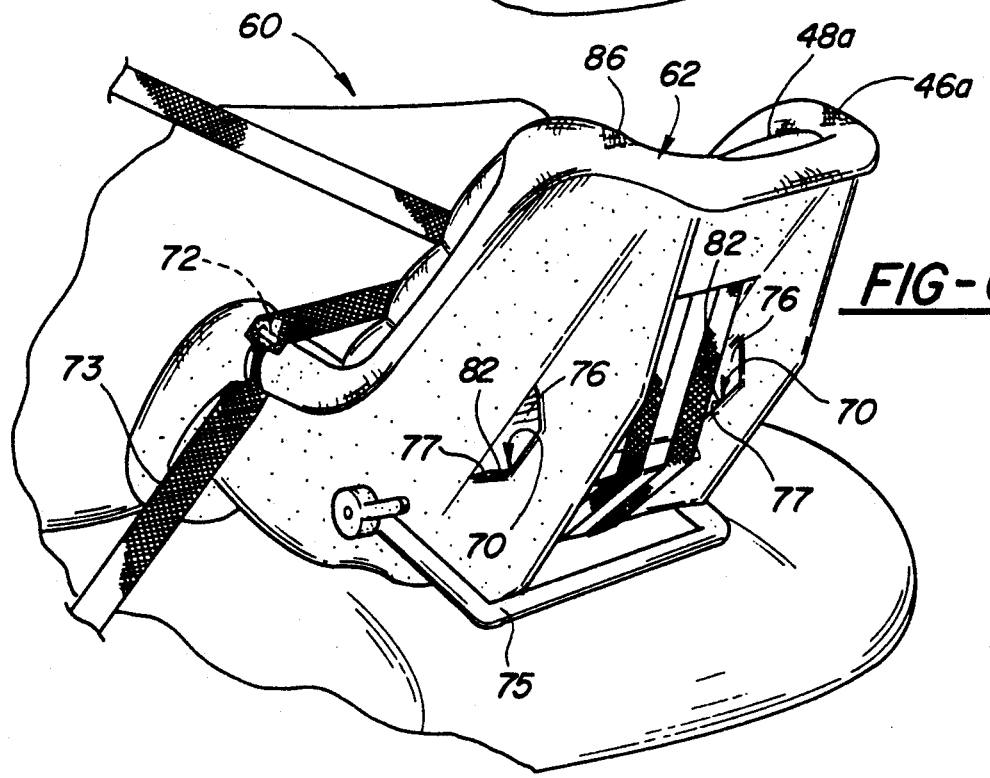

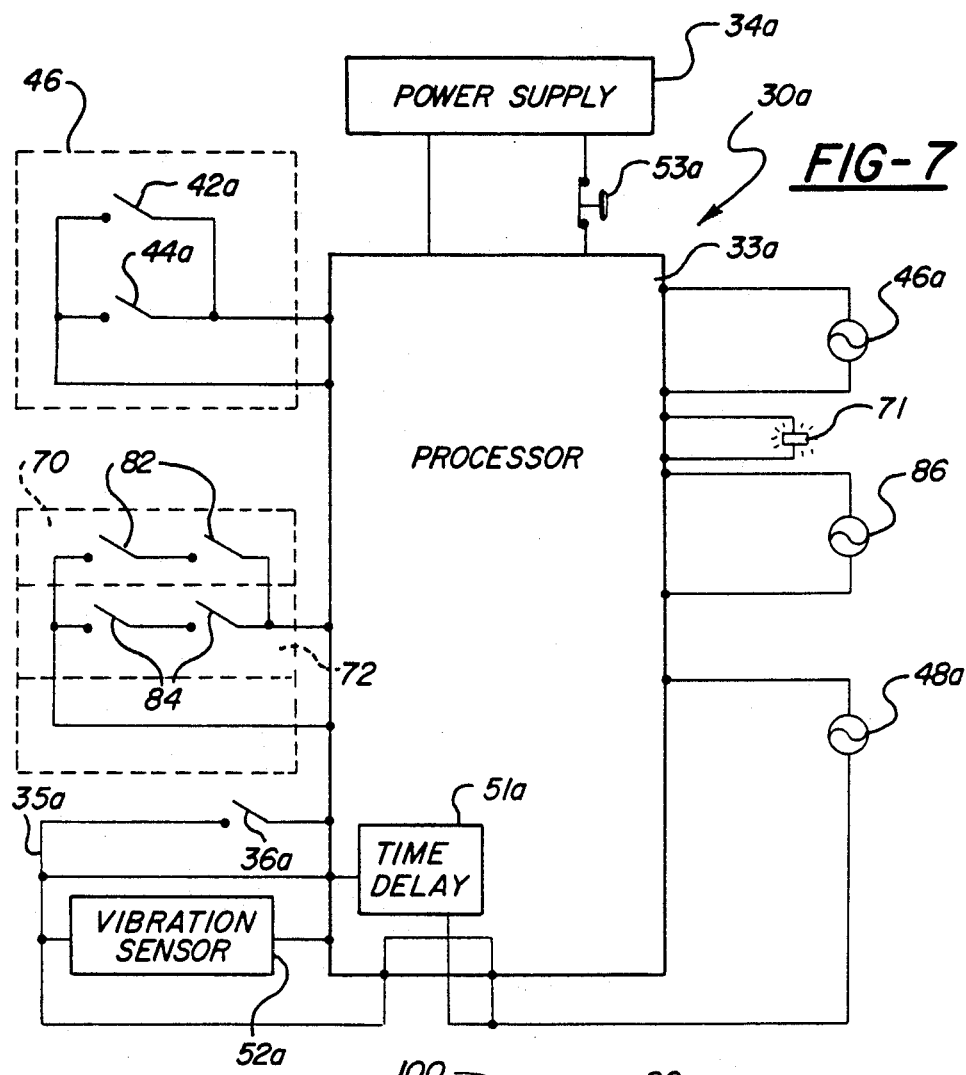
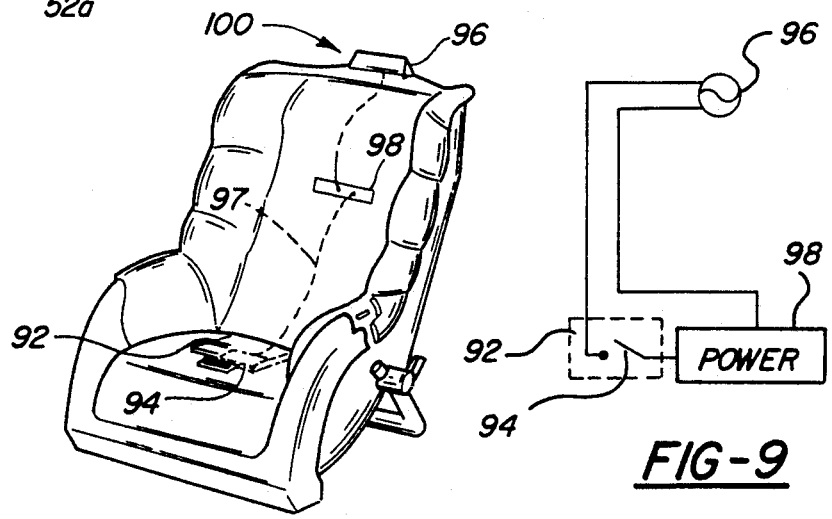

WARNING SYSTEM FOR A CHILD'S RESTRAINING SEAT FOR USE IN A PASSENGER VEHICLE

TECHNICAL FIELD

This invention relates to a passenger vehicle warning system for a child's restraint system.

BACKGROUND OF THE INVENTION

In many states and other jurisdictions it is now required by law that children under a certain weight or age when transported in an passenger vehicle be in a restraining seat which has a restraining harness system particularly suitable for children. The normal belt system for adults does not provide the same benefits when used to restrain toddlers and infants due to toddlers' and infants' smaller size and more fragile bodies. Children restraining systems may offer significant benefits during automobile accidents if used properly. The standard commercially available restraining seat positioned for infants is rearwardly facing so that the infant is seated in a backward reclining position relative to the adult passengers. Toddlers on the other hand are seated in a seat in a forward facing mode. Many commercial portable restraining seats are reversible, i.e., they can be adjusted to be mounted either in the forward facing or reverse position so that a single portable seat can be used for a child until the child outgrows the need for a portable seat with a restraining harness.

There is also rising concern about the lack of child restraining seats in commercial airlines. Current federal regulations allow the use of children restraining seats in airlines and permit the airlines to determine which particular seats will be used on their airplanes. Presently, the airline crew members must inspect each portable seat to determine if the belt and harness are properly used. Secondly, it is difficult to tell if a portable seat is unoccupied or has a small child seated therein because the child's head does not extend above the top of the regular passenger seat.

Children have an additional risk over adults to survive a vehicular accident. If an infant or young child remains conscious after an accident, the child may be unaware of his/her predicament and may not communicate to a rescuer his/her position or may even wander aimlessly away from the accident site. Secondly, because of their small size, children are more difficult to see and find, particularly in severe accidents that may cause a great amount of debris or obstructions to visual inspection. A child's location may also be obscured by adverse conditions such as fog or darkness.

The familiar yellow child-on-board signs that are mounted in many motor vehicle windows have become extremely popular. However, the effect of the signs has been diluted because of the vast popularity and improper usage. Frequently, the sign, once installed, remains in the window whether or not a child is in fact in the motor vehicle. Rescuers who see these signs in a vehicle involved in an accident have to be very careful in investigating the area of the accident before concluding that no child was in the vehicle. The effort to locate an illusory child can often waste very valuable and precious time for any other injured people at the accident site.

One of the side effects of these child-on-board signs, in spite of its dilution is that drivers of other nearby vehicles tend to provide larger clearances and tailgate less often behind vehicles that display these signs.

Currently there is no system on the market today that provides a clear indication to other motorists that is less prone to misuse signifying that a child who cannot be seen due to his/her small size is in fact on board a nearby vehicle and that extra caution should be directed to that vehicle.

Even though many of today's portable child restraining seats can be used in passenger vehicles of all types such as airplanes, buses, vans and automobiles none of them indicates to the crew of an airline or an operator of a motor vehicle that a child is occupying a particular seat or that the restraining harnesses are not properly buckled or fastened.

None of the childrens' restraining seats in today's market offer an emergency indicator which is actuated upon impact or collision and clearly alert rescuers to the fact that a child was occupying that seat at the time of the accident.

What is needed is a child restraining seat that provides an emergency signal upon severe vibration of the seat which would occur during impact or collision to alert rescuers that a child was occupying that seat at the time of an accident. Secondly, what is needed in conjunction with the emergency signal is a warning signal indicating that the child restraining seat is either improperly mounted in the vehicle or a restraining harness of the restraining seat is not properly buckled with the occupant therein.

What is also needed is a convertible vehicular seat that can convert from a regular passenger seat to a child restraining seat which incorporates an emergency signal that is actuated upon a collision or impact and a warning signal indicating that the child restraining system is not properly closed or buckled.

What is also needed is a child-on-board indicator that is visible to other nearby motorists particularly to nearby motorists located behind the child carrying vehicle in which the indicator can be easily actuated and deactuated such that it is on only when there is a child actually occupying the seat.

SUMMARY OF THE DISCLOSURE

In accordance with one aspect of the invention, a portable restraining vehicle seat has an alarm system incorporated in a housing constructed to seat a person, such as a young child. The portable seat has its housing constructed for placement on a permanent vehicular seat. A first securement device engages a vehicular seat belt for securing the housing to the vehicular seat. The housing incorporates a restraining system for restraining an occupant in a seated position in the housing when it is in a closed or locked position. An electrical circuit includes a power supply, a first actuating switch, an alarm system, a first deactuating switch system, a second deactuating switch system, a vibration sensing switch, a reset switch, and an emergency and occupancy indicator. All the components of the electrical circuit are mounted to the housing. The first actuating switch actuates the electrical circuit and is preferably a membrane switch mounted in or under a seat cushion of the restraining seat and sensitive to pressure exerted by a person seated in the restraining seat.

The alarm system can incorporate various warning indicators, emergency signals, and low battery power signals. One warning indicator is actuated when the portable restraining seat is not properly installed in the vehicular seat or does not have its restraining system properly buckled over the occupant. A first deactuation switch system is interconnected with first warning indicator. The deactuating switch system is in proximity to the first securement device and is actuated by pressure exerted by the vehicular seat belt when properly engaging the securement device. The first deactuating switch system can be a pair of pressure sensitive membrane switches mounted in series with each switch being mounted against a housing shoulder that abuts the vehicle seat belt. A second deactuator switch system is interconnected with a second warning indicator and is actuated when the restraining system is fastened closed. The second deactuator switch system can be a pair of switches mounted in parallel with each switch mounted in a respective slot that receives the buckle of the restraining system. A respective switch is actuated when the buckle is inserted in a respective slot. The warning indicators are deactuated when both the first and second deactuating switch systems are actuated. The vibration sensor switch is actuated by severe vibration due to impact or severe deceleration. The vibration sensor switch actuates an emergency indicator which, once actuated, is maintained in its actuated mode and overrides the first actuator switch and the first and second deactuating switches until the reset switch is actuated.

Preferably, the child restraining seat includes a second securement device for allowing the seat to be mounted in either a reverse or forward position so that either an infant or toddler can properly occupy the restraining seat. A third deactuating switch system is preferably mounted in proximity of the second securement device and is actuated by the vehicular seat belt when it is properly engaging the securement device. The third deactuating is similar to the first deactuating device, i.e., it is a pair of membrane switches mounted in series with each switch in proximity to a shoulder of the housing. The first and third deactuating switch systems are mounted in parallel with each other. The warning indicator system preferably includes first and second indicators which are actuated after the actuating switch actuates the electrical circuit. The first indicator is actuated when the first and third deactuating switch systems are not closed to indicate the portable seat is not properly fastened onto the passenger seat. The second indicator is activated when the second deactuating switch system is not closed to indicate the restraining harness is not properly fastened. Preferably, the first and second indicators are flashing light emitting diodes.

Preferably, the emergency and occupancy indicator is actuated in a first mode to provide an occupancy indication of the presence of an occupant in the child restraining seat. The occupancy mode can be a strobe light flashing at a frequency high enough to render the appearance of a light being continuously on to the human eye. The strobe light has a cycle where at least 50% of the cycle time is in the deactuated mode to conserve the power supply. The occupancy indicator can be a light mounted to an upper section of the restraining seat housing such that it is visible from the exterior of a motor vehicle in a rear, front or side direction. However, when the vibration or inertia sensor switch is actuated a distinctive second emergency mode commences. The emergency mode has a slower visibly perceivable flashing cycle. Optionally, the emergency indicator can also include a bell or other audio signal.

In accordance with another aspect of the invention, an alarm is incorporated in a child restraining seat that is integrated into a convertible passenger seat with the child restraining seat being positionable between a stow-away position and a usable position. An actuating switch mechanism includes a first sensor switch actuated when the child restraining seat is in the usable position and a second sensor switch actuated when an occupant sits in the child restraining seat. The first and second switches are mounted in series in a primary actuating circuit. An optional set of parallel switches can be mounted in series with the first and second sensors so that the child restraining seat can be used as a booster seat without the use of the harness warning indication and occupying indicator. The alarm system is actuated when the actuation sensor switch mechanism is closed. A secondary actuation circuit can be incorporated to provide an emergency signal if the vibration sensor switch is actuated when the seat is being used as a booster seat for older children.

The occupancy indicator can be a light mounted on a pivoting upper portion of the integrated child restraining seat such that when it is in a stow-away position the occupancy indicator is concealed from sight and when in the usable position is located at a top edge of the upper portion.

In accordance with a broader aspect of the invention, a warning system has an electrical circuit and an actuation switch mechanism for actuating the electrical circuit and an alarm system. The warning system is actuated by the actuation switch. A first deactuation switch system is interconnected to an openable and closable restraining system for a vehicle seat. When the restraining system is closed, the warning system is deactuated. A vibration or inertia sensor switch is closable upon severe vibration such as severe deceleration or impact of the motor vehicle to actuate the warning system and by-passing the deactuation switch system when the electrical circuit is actuated until the reset switch is actuated.

In accordance with another aspect of the invention, an occupancy indicator system for a child restraining seat includes an occupancy sensor switch positioned at the seat portion of the restraining seat and actuatable by weight of the occupant. An occupancy indicator is actuated by an electrical circuit that is interconnected with the sensor switch. The occupancy indicator is mountable to be visible from the exterior of a motor vehicle. In one embodiment the occupancy sensor switch is mounted on a padded cushion that is positionable on the seat portion of a child restraining seat.

In this fashion, a child restraining seat provides the clear indication when its buckle is unfastened or it is improperly mounted. The child restraining seat also provides for an occupancy indication that can be visible from the exterior of the vehicle to act as a warning system for nearby motorists or, in the case of large passenger vehicles such as airplanes to crew members. The child restraining seat is also provided with a vibration or inertia sensor switch which once actuated overrides the deactuation switches to provide for an emergency signal that can be audible and/or visual to provide a clear indication that at the time of actuation of the inertia switch, the child restraining seat was occupied.

BRIEF DESCRIPTION OF THE DRAWINGS

Reference now is made to the accompanying drawings in which:

FIG. 5 discloses a portable child restraining seat incorporating an embodiment of the invention;

FIG. 6 is a side-elevational and partially schematic view of the seat shown in FIG. 5;

FIG. 7 is an electrical schematic of the warning system shown in FIG. 5;

FIG. 8 discloses an occupancy indicator for use with a passenger vehicle seat; and FIG. 9 is an electrical diagram for the system shown in FIG. 8.

DETAILED DESCRIPTION OF THE PREFERRED EMBODIMENTS

Figure 1:
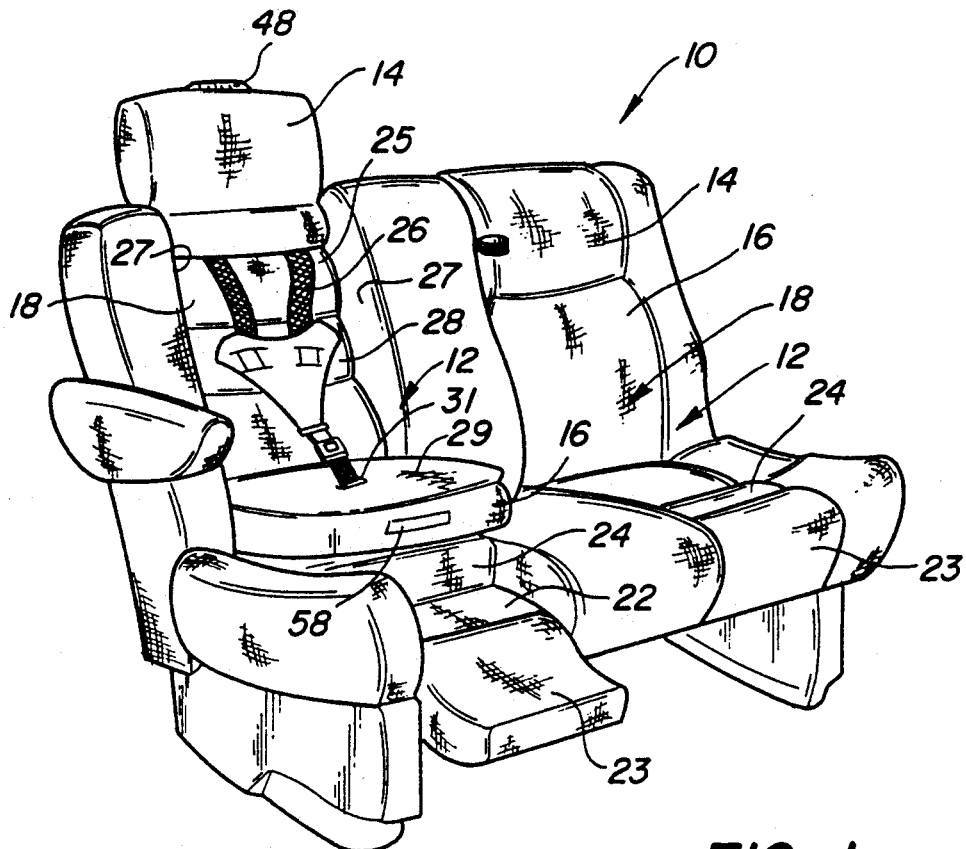
FIG. 1 is a perspective view of a motor vehicle bench seat incorporating integrated child restraining seats according to one embodiment of the invention with one restraining seat being in a stowed position and a second being unfolded to a usable position.
Figure 2:
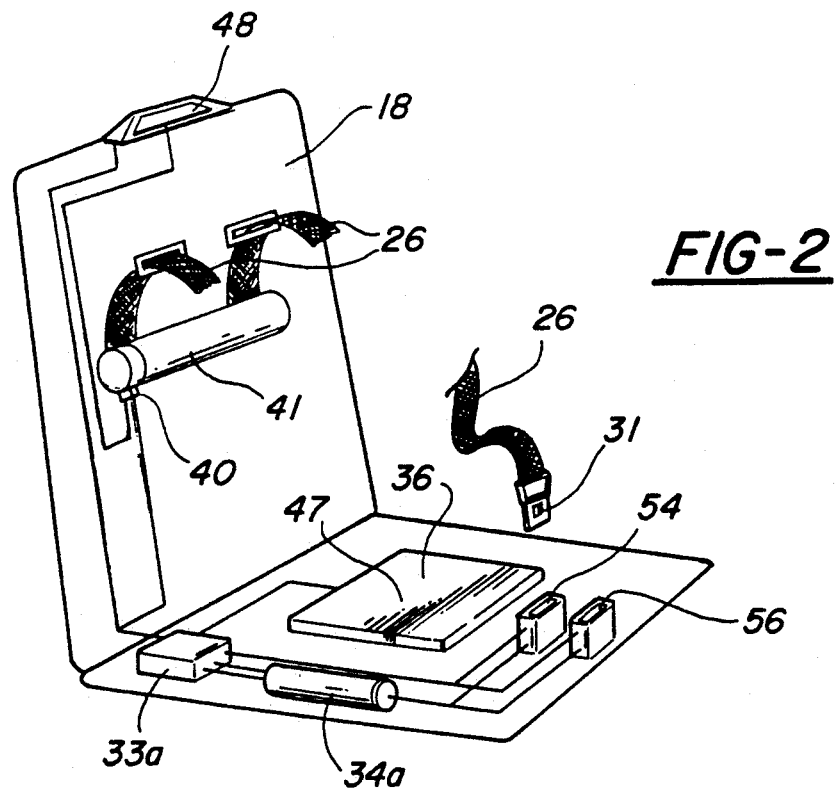
FIG. 2 is a side elevational and partially schematic view indicating location of various components of a warning system incorporated in the child restraining seat shown in FIG. 1.

Referring now to FIG. 1, a motor vehicle seat 10 includes two integrated child restraining seats 12 which can be either in the stow-away or folded position as shown at the right half of seat 10 or in a usable or unfolded position as shown in the left half of seat 10. Each restraining seat 12 includes a head rest 14 which unfolds upward and a seat cushion 1 6 which folds downward. When in the stow-away position, both the head rests 14 and seat cushion 16 comprise seat back 18 of motor vehicle seat 10. A foot well 22 is formed by the downward pivoting motion of front section 23 of vehicle seat cushion 24. When the child restraining seat is folded out to the usable position, a child restraining harness 26 is exposed in the recessed back portion 25 between side shoulders 27. As shown in FIG. 2, the harness 26 is connected to a retracting device 41 in the seat back 18 and extends out from seat back 18. A removable cushion 28 may be interposed between the harness 26 and the recessed back portion 25. Another removable cushion 29 may lie on the seat cushion 16.

Figure 3:
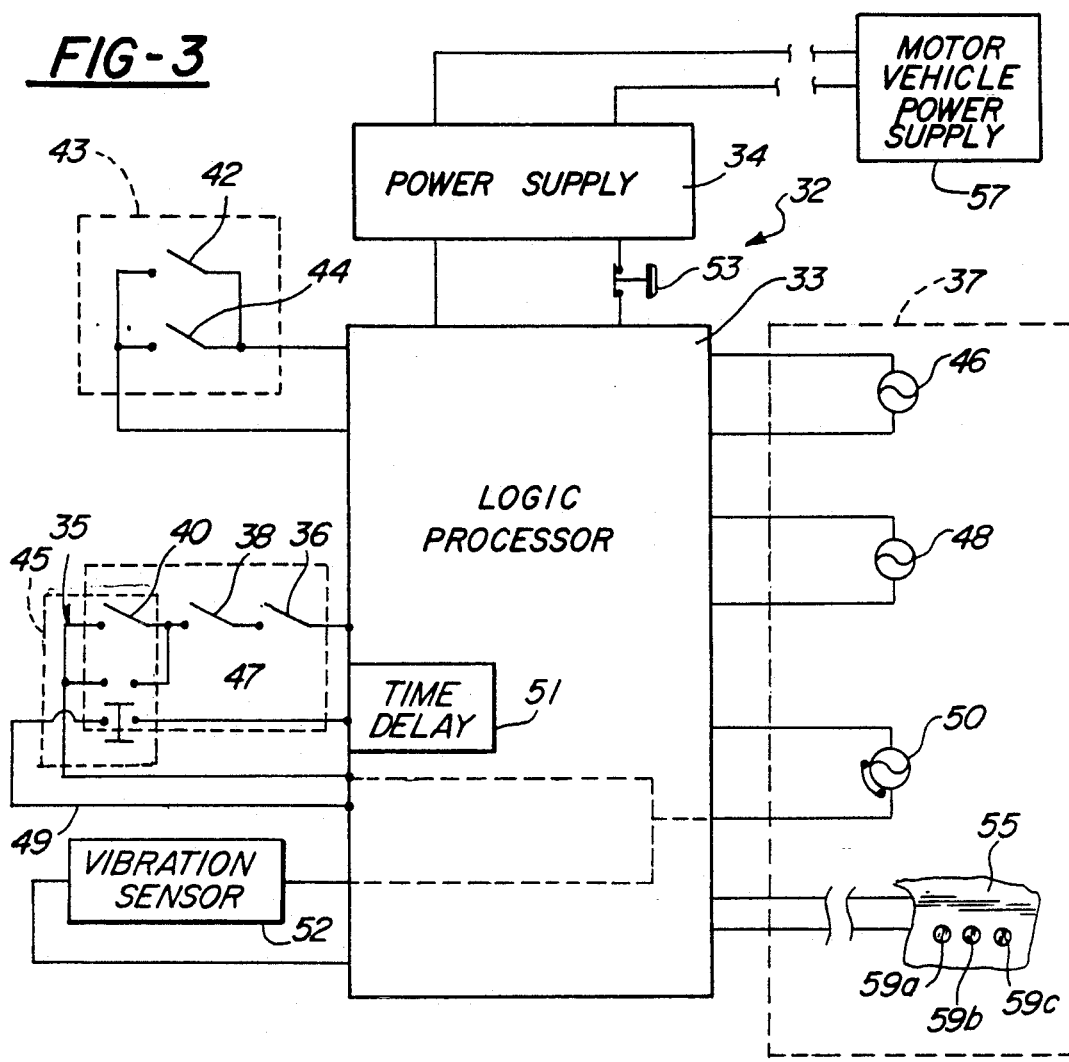
FIG. 3 is an electrical schematic of the warning system shown in FIG. 2.

Referring now to FIGS. 2 and 3, a warning system generally indicated as 30, has an electrical circuitry 32 which includes an integrated logic circuit 33, a power supply 34, actuation system 35, and alarm system 37 and deactuation system 43. The actuation system 35 includes two actuation switches 36 and 38 mounted in series with each other. The warning deactuating switch mechanism 43 incorporating two deactuation switches 42 and 44 which are mounted in parallel with each other and the alarm system 37. The alarm system 37 includes a buckle warning indicator 46, an occupancy indicator 48, and an emergency indicator 50. Actuation switch 36 is a weight sensitive membrane switch mounted in seat cushion 16 that can sense the presence of a child sitting thereon. Actuation switch 38 is a position indicator switch such as a mercury switch or magnetic switch which is mounted to the pivot mechanism 39 for seat cushion 16. The switch 38 is actuated when the seat cushion 16 is lowered to the unfolded down position as shown in FIG. 2.

Once the two actuation switches 36 and 38 are closed, the integrated circuit 33 is in an actuated mode and in turn actuates the buckle warning indicator 46. The indicator 46 can be an audio or visual signal to indicate that the restraining harness 26 does not have its buckle 31 properly fastened into the slots 54 or 56. Deactuation switches 42 and 44 are incorporated into buckle slots 54 and 56 in seat cushion 16 which senses when the child harness 26 has fastened and locked into one of the slots 54 and 56. When either switch 42 or 44 is closed, the buckle warning indicator 46 is turned off. Furthermore, when the integrated circuitry 33 is actuated by actuation system 35, occupancy light indication 48 is also actuated. The electrical circuit 32 also contains an inertia or vibration sensor switch 52 which is normally in the open position and is insensitive to normal vibrations occurring either in a normal airplane flight or encountered in a normal motor vehicle ride. However, when severe vibrations are encountered of the type caused by a collision or impact, the vibration sensor switch 52 closes to activate the emergency indicator 50 which can either be an audible beeping tone or a flashing light or a combination of both. If desired, the emergency indicator 50 and the occupancy light 48 can be integrated together. Occupancy light 48 is preferably mounted in an upper portion of the seat as shown in FIG. 1. The emergency signal however must be distinguishable from the occupancy signal. One way of doing this is to have the visual occupancy signal to appear to be continuously on while the emergency signal can be produced by a visually perceptible flashing on and off cycling. Once the vibration sensor switch 52 is actuated, the emergency signal continues even though one or more of the actuation switches 36, 38, 40 or 47 may be open. The emergency signal is also independent of the position of deactuation switches 42 and 44. The emergency signal 50 continues until it is shut off by operation of reset switch 53. Reset switch 53 may be mounted in slots 54 and 56 to be automatically actuated by insertion of buckle 57 into either slot 54 or 56.

The integrated circuit 33 has a built-in time delay 51 before the circuit 33 is deactuated if the switches 36, 38, 40 or 47 are opened. This time delay which can be on the order of ¼ to ½ second assures that the vibration sensor 52, actuated during severe vibrations, actuates the emergency signal before the circuit 33 may become deactuated. It also assures the circuit to remain on in spite of any bouncing a child may do in the seat.

As shown in FIG. 2, the complete warning system 30 including the power supply 34, integrated circuit 33 and alarm system 35 can be incorporated in the seat as a complete entity. Furthermore, the power supply 34 can be a rechargeable battery supply that is wired into the motor vehicle power supply 57 to keep it fully charged. However the power supply 34 once charged runs independently such that if the wires to the motor vehicle power supply are cut during impact, the warning device has a fully charged independent power supply to actuate an emergency indicator 50.

The occupancy light 48 as shown in FIG. 1 is incorporated into the headrest 14 such that when the headrest is unfolded to the used position, the occupancy light 48 is visible particularly from a rear direction from the exterior of the vehicle. When the headrest is folded down into the storage position as shown in FIG. 1 in the right half of FIG. 1, the occupancy light 48 is concealed out of sight. A recess 58 can be incorporated in seat cushion 16 to accommodate the occupancy indicator light assembly 48.

Figure 4:
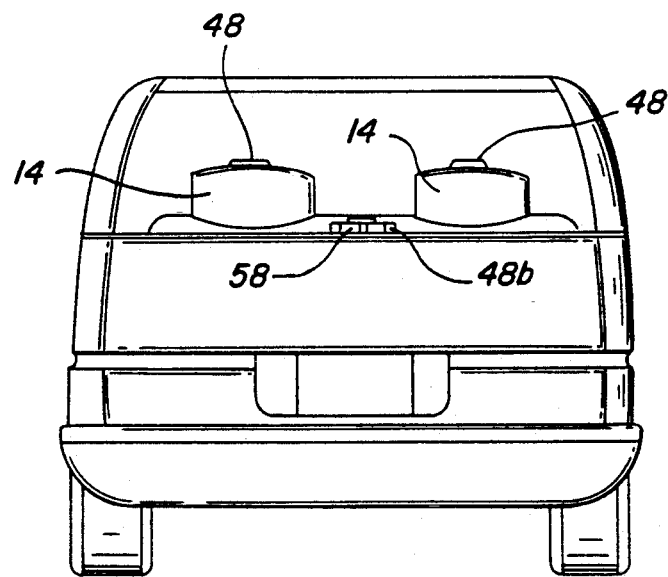
FIG. 4 is a rear elevational view of a motor vehicle incorporating the occupancy indicators of the warning system shown in FIG. 2.

It is also foreseen that an occupancy indicator can be mounted on a rear window of the vehicle as shown in FIG. 4 in place of or in addition to the indicator on the seat itself. This indicator is shown as indicator 48a which is adjacent the central brake light 58. The alarm system 35 can include optional secondary warning lights 59a, 59b and 59c which function similarly as indicators 46, 48 and 50. The lights 59a, 59b and 59c can be mounted on the vehicle dashboard 55 for the convenience of the vehicle driver.

An optional, booster seat, i.e., secondary actuation switch mechanism generally indicated at 45 provides for the seat to be used as a booster seat for larger and older children. A switch 40 is interconnected to the restraining harness 26 retracting device 41 so that it is actuated when the harness 26 is pulled away from seat back 18 a predetermined amount which indicates that the harness 26 is intended to be used for a child's restraining seat. When a booster seat is desired, a drop switch 47 is mounted in parallel to switch 40 and is normally in the closed position. The drop switch 47 is mounted in the seat cushion 16 and detects when a child weighing over 40 lbs. is occupying the seat. If the harness is not pulled out, and the drop switch 47 is actuated, only secondary actuation circuit 49 is actuated and not primary actuation system 35.

In operation, the electrical circuit remains inactive while the seat cushion 16 is folded in the stowaway position. The head rest 14, seat cushion 16 and foot well 23 are unfolded, and the infant or toddler is seated on cushion. At this point, the electrical circuit is actuated and warning indicator is on until the harness 26 is properly fastened in one of the slots 54 and 56. At the end of use, the harness is unbuckled, the child is removed from the car seat and the harness is retracted. At this point the electrical circuit is deactuated. The child restraining seat may either remain open or be folded up.

The optional secondary switch system 45 includes switch 40 on the retraction device 41 allows the seat to be used as a booster seat for older children. When used as a booster seat, the seat's warning and occupancy indicator 46 and 48 is not actuated because the child (1) uses the standard passenger seat belts and (2) is large enough to be seen from the exterior of the vehicle. The harness 26 remains retracted against recessed back section 25 and the removable cushion 28 is placed over the harness 26. A larger and older child is then seated on the seat cushion 16 and uses the normal (i.e., adult) passenger seat belt 31. The weight of the larger child over 40 lbs. opens the drop switch 47 to open actuation circuit 35. With both switches 40 and 47 being open, the indicators 46 and 48 do not become actuated. If a heavy toddler is on the seat, and harness 26 is extended to be used, the circuit is actuated by the closure of all three switches 36, 38 and 40.

Drop switch 47 is also incorporated in secondary actuation circuit 49 so that when circuit 35 becomes open, circuit 49 closes. The closure of secondary circuit 49 provides that the actuation of vibration sensor switch 52 turn on emergency indicator 50.

Another embodiment of the invention is incorporated in a portable restraining seat as shown in FIGS. 5, 6 and 7. As shown in FIG. 5, a portable restraining seat 60 has a plastic housing 62 shaped to sit an infant or toddler therein. Suitable padding 64 is permanently positioned in the seating area 65 of the housing 62. The housing has a harness system 66 that can be received and fastened in one of two receptacle slots 68 and 69. The seat has two securement systems 70 and 72 to provide for alternative mountings of the seat 60 onto the motor vehicle seat 74. A forward mounting position for toddlers is shown in FIG. 5 where the vehicle seat belt 73 passes through the securement system 70 which provides a passageway 71 in housing 62 behind the seating area 65. As shown in FIG. 6, the seat can also be mounted with seat belt 73 through the securement system device 72, in a reverse position for infants. Securement system 70 include a left and right opening 76 through housing 62 located behind the seating area 65 with abutment shoulders 77 for receiving seat belt 73. Securement system 72 includes left and right slots 79 located on respective left and right arm rests 80. Each slot 79 includes a shoulder section 81 that abuts the belt 73. The seat 60 can have various adjustment and convenience mechanisms 75 which are conventional in the art.

As schematically shown in FIGS. 6 and 7, the warning system 30a includes an alarm system 37a, and an actuation system 35a which include an actuation switch 36a. The switch 36a is a pressure sensitive switch positioned in or under the padding 64 in the seating area 65. A first warning deactuation switch mechanism 43a includes membrane switches 42a and 44a mounted in parallel with each other and operably incorporated into slots 68 and 69 respectively. A second deactuation switch system 78 is built into securement system 70 and incorporates two switches 82 in series with each other. A third deactuation switch system 83 is built into securement system 72 and includes two switches 84 in series with each other. The pair of switches 82 and the pair of switches 84 are parallel with each other. Each switch 82 is located on a respective shoulder 77 in respective opening 76. Each switch 84 is located on a respective shoulder 81 in respective slot 79. The circuitry 30a includes integrated circuit 33a, power supply 34a, and reset switch 53a in the same fashion of the first embodiment. The warning deactuation system switches 43a deactuates the buckle indicator 46a in the same fashion as described with the first embodiment. Vibration switch 52a also functions similarly to the one shown in the first embodiment with a time delay 51a built into circuit 33a before it is deactuated.

In operation, when the child is placed in the portable seat, the pressure actuated switch 36a under padding 64 is closed to actuate circuit 33a at which time the buckle indicator light 46a is activated until the harness 66 is properly fastened within one of the slots 67 and 68 in the housing 62 that actuates a respective deactuation switch 42a or 44a. The buckle indicator light 46a may be a flashing LED. Alternatively, an audible chime or tone may be substituted for the flashing LED.

If neither of the pairs of switches 82 or 84 are closed, the lap belt indicator 86 remains actuated. This indicator warns the operator that the belt 73 is not properly mounted in either both slots 79 or both openings 76 and tightened a sufficient amount. The lap belt indicator 86 can be an LED similar to the buckle indicator 46a. The occupancy indicator 48a is mounted on the top portion of the housing to be visible from both the front and the rear. The occupancy indicator 48a has two modes, an occupancy mode and emergency mode. The occupancy mode is set so that when the actuation switch 36a is pressed, the occupancy indicator flashes on and off at a high rate such that the light appears to be continuously on to the human eye. The flashing cycle conserves the power supply relative to a light that is continuously on. The cycle can be set such that the on cycle is less than 50% of the total cycle time.

The vibration sensor switch 52a is normally in the open position and is constructed to resist vibrations that normally occur during a normal motor vehicle ride or normal air flight. However, during a severe vibration that would occur during collision or impact, the inertia switch is closed which provides for the integrated circuit 33a to change the indicator 48a from its occupancy mode to an emergency signal. The emergency signal is a flashing light cycled at a frequency that is perceptually visible to the human eye. Optional chimes or audio signals can also be incorporated with the emergency signal.

As with the first embodiment, the actuation of the vibration sensor switch 52a overrides the actuation switch 36a or deactuation switches 43a, deactuation switches 82 and 84 if the system's integrated electrical circuit 33a is in the actuated mode at the time the switch 52 is actuated. The emergency signal remains actuated until reset switch 53a is pressed. A low power battery indicator 71 is also connected to the integrated circuit 33a. The indicator 71 may be a beep tone or other distinctive audio signal to forewarn the operator to recharge or replace the power supply 34a.

It is foreseen that the warning system as shown in FIG. 7 can also be incorporated into a wheel chair in much the same fashion as shown for the portable restraining seat as shown in FIG. 5 and 6.

An after-market occupancy indicator system is disclosed in FIGS. 8 and 9. The occupancy indicator includes a cushion pad 92 which can be placed on a conventional child restraining seating area cushion as shown in FIG. 5. When a child sits on the pad 92, the pressure sensitive switch 94 is closed and actuates the occupancy indicator light 96. The switch and light 96 are connected to a power supply 98 which is mounted also within the pad. The light 96 can be affixed in a housing 100 that can be connected with Velcro type or other fastener systems 101 to the top of the child restraining seat 102. The cord 97 that connects the light to the switch 94 can be placed under the cushion or may be coiled and placed adjacent the seat.

In this fashion, an occupancy light is provided for children in either an integrated child seat, a portable child seat or in an after-market weight switching mechanism for use with a conventional car restraining seat. Furthermore, a warning indicator system is provided which provides for an alarm which alerts the user that either the portable child restraining seat is not properly secured onto a motor vehicle car seat or that the child restraining harness system is not properly locked in position to restrain the child. Furthermore, an emergency signal is provided by actuation of a vibration sensor switch which alerts rescuers or other people that a child is or was in the car seat at the time of the actuation of the vibration sensor switch.

Furthermore, an occupancy light is positioned in the upper part of the car seat that can be visible from the rear of a motor vehicle which provides for a warning to a nearby motorist that children are aboard the motor vehicle.

Other variations and modifications are possible without departing from the scope and spirit of the invention as defined in the following claims.

The embodiments in which an exclusive property and privilege is claimed are defined as follows:

1. A warning system for a passenger restraining seat usable in a passenger vehicle, said system comprising:
   an electrical circuit including a power supply which includes a battery mounted to said restraining seat, said battery being separate from another battery which operates the vehicle, a primary actuation switch mechanism, a first deactuation switch, and an alarm system including a vibration sensor switch and a reset switch;
   said primary actuation switch mechanism for actuating said electrical circuit and said alarm system;
   said alarm system including at least one alarm indicator actuated by said actuation switch;
   said first deactuation switch interconnected with an openable and closable occupant restraining system for a passenger vehicle seat for deactuating said at least one alarm indicator when said restraining system is closed;
   said vibration sensor switch being closable upon severe vibration to actuate said at least one alarm indicator, said electrical circuit being operative when said alarm indicator is actuated to bypass said first deactuation switch until said reset switch is actuated.

2. A warning system as defined in claim 1 further including:
   said actuation switch being a pressure sensitive switch positioned to sense the presence of an occupant in a passenger vehicle seat.

3. A warning system as defined in claim 1 wherein said alarm system includes:
   a warning indicator being actuated when said electrical circuit is actuated until said first deactuation switch is actuated; and
   an emergency indicator being actuated when said vibration sensor switch is actuated at the time the electrical circuit is actuated.

4. A warning system as defined in claim 3 wherein said warning indicator and emergency indicator are two audio signals distinguishable from one another.

5. A warning system as defined in claim 3 further comprising said electrical circuit has a time delay mechanism which delays deactuation of said circuit after said actuation mechanisms are opened.

6. A warning system as defined in claim 1 further including:
   an occupancy indicator positionable to be viewable from an exterior of said passenger vehicle and connected to and actuated by said electrical circuit.

7. A warning system as defined in claim 6 wherein said occupancy indicator is a light element cyclically flashed on and off with said light actuated less than 50% of the cycle time at a frequency high enough to render the appearance of the light being continuously on to the human eye.

8. A warning system as defined in claim 6 wherein said occupancy indicator is positioned at an upper portion of said restraining seat to be viewable from the exterior of said passenger vehicle.

9. A warning system as defined in claim 1 wherein:
   said warning system is incorporated in a child restraining seat that is integrated into a passenger vehicle seat with said restraining seat being positionable into a folded stow-away position or into a usable position;
   said actuating switch mechanism includes a first sensor switch actuated when said child restraining seat is in a usable position and a second sensor switch actuated when an occupant sits in said child restraining seat;
said electrical circuit is in an actuated mode when both sensor switches are actuated.

10. A warning system as defined in claim 9 wherein said alarm system includes:
a warning indicator actuated when said electrical circuit is actuated until said first deactuation switch is actuated; and
an emergency indicator actuated when said vibration sensor switch is actuated if the electrical circuit is actuated.

11. A warning system as defined in claim 10 wherein said warning indicator and emergency indicator are two audio signals distinguishable from one another.

12. A warning system as defined in claim 9 wherein said power supply is a battery mounted in said passenger vehicle seat.

13. A warning system as defined in claim 12 further including:
an occupancy indicator positionable to be viewable from an exterior of said passenger vehicle and connected to and actuated by said electrical circuit.

14. A warning system as defined in claim 13 wherein said occupancy indicator is a light element being flashed on and off with said light actuated less than 50% of the cycle time at a frequency high enough to render the appearance of the light being continuously on to the human eye.

15. A warning system as defined in claim 13 wherein said occupancy indicator is mounted on a pivoting head rest portion of said passenger vehicle seat; said head rest pivotable between stow-away position where said occupancy indicator is concealed from sight and a usable position where said occupancy indicator is positioned at an upper section of said head rest portion.

16. A warning system as defined in claim 9 wherein said restraining system is movable from a retracted stored position to an extended usable position; said actuator switch mechanism includes a booster seat switch mechanism that has a third sensor switch that is actuated when said restraining system is moved to said extended usable position; a drop switch is mounted in parallel to said third sensor switch and is normally in a closed position but is operable upon sensing weight over a predetermined amount.

17. A warning system as defined in claim 16 further comprising:
said alarm system including a first warning indicator actuated when said electrical circuit is actuated until said first deactuation switch is actuated, and an emergency indicator actuated when said vibration sensor is actuated if the electrical circuit is actuated;
said booster seat switch mechanism being interconnected to a secondary actuation switch mechanism which actuates said electrical circuit and does not actuate said first warning indicator, said booster seat switch mechanism being responsive to the weight of a larger child over a predetermined amount.

18. In a child restraining seat integrated into a vehicle passenger seat having a passenger seat back cushion and passenger seat bottom cushion, a child seat cushion unfoldable from one of the passenger seat cushions from a stored position to a usable position, and a child restraining harness stored in proximity to the child seat cushion when folded in the stored position, the improvement comprising:
an electrical circuit including a power supply which includes a battery mounted to said restraining seat, said battery being separate from another battery which operates the vehicle, a primary actuation mechanism, a warning deactuation system, and an alarm system including a vibration sensor switch and a reset switch;
said primary actuation mechanism for actuating said electrical circuit including a first sensor switch actuated upon the unfolding of the child seat cushion out from the stored position to the usable position and a second sensor switch mounted in the child seat cushion and responsive to the weight of a child sitting on said child seat cushion, said electrical circuit being actuated when both sensor switches are actuated;
the alarm system includes a warning indicator that is actuated when said electrical circuit is actuated by said primary actuation mechanism;
the warning deactuation system includes a deactuation switch mounted in proximity to a buckle-receiving, locking slot for receiving said restraining harness, said deactuation switch disposed so as to be actuated when said restraining harness is properly fastened in said locking slot, said switch operative when actuated to deactuate said warning indicator;
the alarm system further includes an emergency indicator that is actuated by said vibration sensor and through said electrical circuit in response to a severe vibration so as to indicate an emergency condition, said electrical circuit operative, once it actuates said emergency indicator, to maintain actuation of said emergency indicator independent of the positions of the sensor switches or deactuation switch until said reset switch is actuated.

19. In a child restraining seat as defined in claim 18 further comprising:
said alarm system including an occupancy indicator mounted on said vehicle to be viewable from an exterior of a passenger vehicle actuated when a child occupies said child restraining seat to indicate to nearby motorists that a child is occupying said child restraining seat in said passenger vehicle.

20. In a child restraining seat as defined in claim 18 further comprising:
a third sensor switch that is actuated when said restraining harness is extended from said stored position;
a booster seat switch mechanism being mounted in parallel to said third sensor and being interconnected to a secondary actuation mechanism which actuates said electrical circuit and does not actuate said warning indicator, said booster seat switch mechanism being responsive to a weight of a child over a predetermined amount.

21. In a child restraining seat integrated into a vehicle passenger seat having a passenger seat back cushion and passenger seat bottom cushion, a child seat cushion unfoldable from one of the passenger seat cushions from a stored position to a usable position, and a child restraining harness stored in proximity to the child seat cushion when folded in the stored position, the improvement comprising:
an electrical circuit including a power supply which includes a battery mounted to said restraining seat, said battery being separate from another battery which operates the vehicle, a primary actuation mechanism, a warning deactuation mechanism, and an alarm system including a vibration sensor switch and a reset switch;

said primary actuation mechanism for actuating said electrical circuit including a first sensor switch actuated upon the unfolding of the child seat cushion out from the stored position to the usable position and a second sensor switch mounted in the child seat cushion and actuated by the presence of an occupant sitting on said child seat cushion, said electrical circuit being actuated when both sensor switches are actuated;

the alarm system includes a warning indicator that is actuated when said electrical circuit is actuated by said primary actuation mechanism;

the warning deactuation system includes a deactivation switch mounted such that it is actuated when said restraining harness is properly fastened for deactuating said warning indicator; and the alarm system includes an emergency indicator that is actuated by said vibration sensor switch that is responsive upon severe vibration indicating an emergency condition, said electrical circuit once it actuates said emergency indicator maintains actuation of said emergency indicator independent of the positions of the sensor switches or deactuation switch until said reset switch is actuated.

* * * * *